Feb. 27, 1940.  H. E. SJÖSTRAND  2,191,730
POSITION INDICATING DEVICE FOR A MOVABLE BODY
Filed March 25, 1937  2 Sheets-Sheet 1

INVENTOR
HJALMAR E. SJOSTRAND
By
ATTORNEYS

Feb. 27, 1940.  H. E. SJÖSTRAND  2,191,730
POSITION INDICATING DEVICE FOR A MOVABLE BODY
Filed March 25, 1937  2 Sheets-Sheet 2
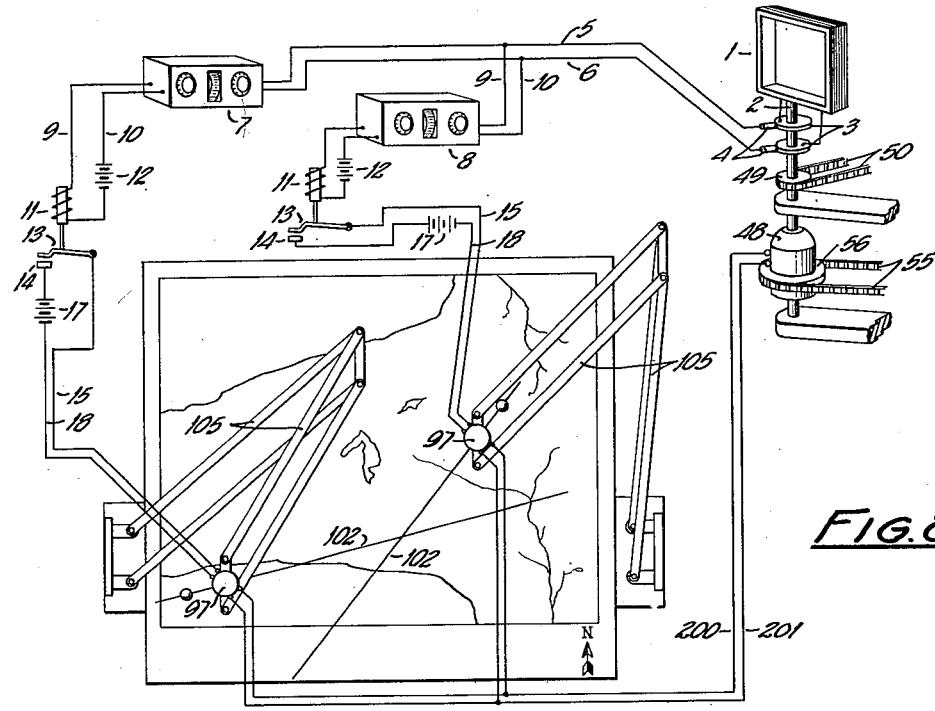
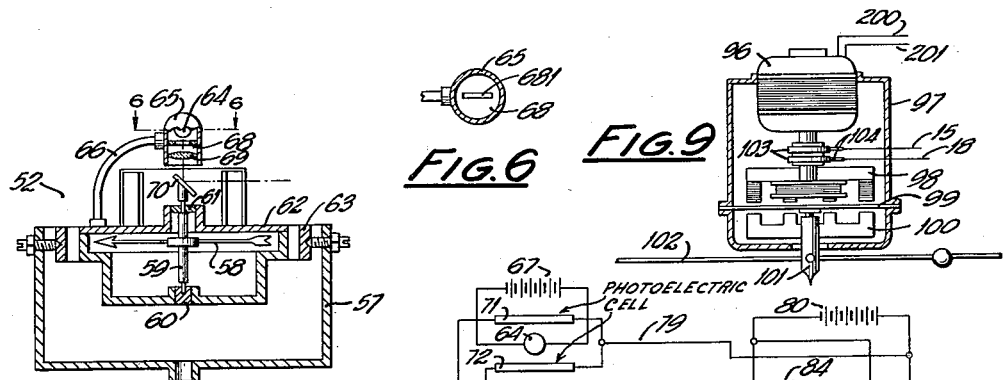
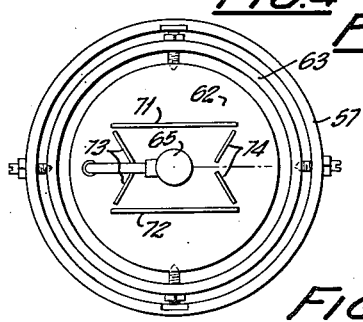
INVENTOR
HJALMAR E. SJOSTRAND
By
ATTORNEYS Patented Feb. 27, 1940

2,191,730

UNITED STATES PATENT OFFICE 2,191,730

POSITION INDICATING DEVICE FOR A MOVABLE BODY

Hjalmar E. Sjöstrand, Ravala, Grangesberg, Sweden

Application March 25, 1937, Serial No. 133,090
In Great Britain March 9, 1936

2 Claims. (Cl. 250—11)

My invention particularly relates to a device comprising means operable in response to electromagnetic waves transmitted from radio stations which is adapted to indicate on a chart the geographical position of the movable body upon which it is mounted. In my Patent No. 2,043,336, issued June 9, 1936, I have disclosed a similar device which is designed for use with a chart disposed in fixed relation to the vessel and therein I have disclosed a means for compensating for turning movements of the vessel or movable body and nullifying the effect which such movement would otherwise impart to the position indicators.

My present invention constitutes an improved position indicating device and comprises a combination of elements which are so arranged that the effect of a turning movement of the movable body is rectified or compensated for irrespective of the disposition of or the position occupied by the chart with which the indicating mechanisms thereof are associated. My invention, therefore, has for a first object the provision of means cooperable with a chart to indicate the geographical location of a movable body thereon in combination with means, responsive to electromagnetic waves, for positioning said indicators and means for connecting said indicator positioning means with said electromagnetic - wave responsive means, said connecting means being characterized by the fact that substantially universal movement of said chart may be effected without affecting the correct positioning of said indicators.

Another object resides in providing in a device of the foregoing character electrical means for rotating the indicator positioning means and the electromagnetic-wave responsive means in timed relation together with means associated with said electrical means for compensating for a turning movement of the vessel whereby irrespective of the movement of the vessel, the indicators will be maintained in positions relative to the chart which correctly indicate the position of the vessel and the direction therefrom to chosen broadcasting stations.

More specifically, another object resides in the provision of rotatable, electrical means for positioning an indicator, said means being rotatable in synchronism with a loop antenna and movable over a chart but fixed against angular movement relative thereto in combination with means, associated and rotatable with said loop, upon which compensation is effected for turning movements of the vessel.

With these and other objects in view, my invention includes the novel elements and the combinations and arrangements thereof described below and illustrated in the accompanying drawings in which—

Fig. 4 is a sectional view through the compass mechanism for orienting the motor or generator associated with the loop;

Fig. 5 is a plan view of Fig. 3;

Fig. 6 is a sectional view taken through the lamp casing in about the plane 6—6 of Fig. 4;

Fig. 7 is a wiring diagram of the electrical connections for the compass mechanism and associated, orienting motor;

Fig. 8 is a perspective view, similar to Fig. 1 but illustrating a modified form of my invention; and Fig. 9 is a fragmentary, sectional view taken through the indicator-positioning mechanism adapted for use with the modification illustrated in Fig. 8.

Figure 1:
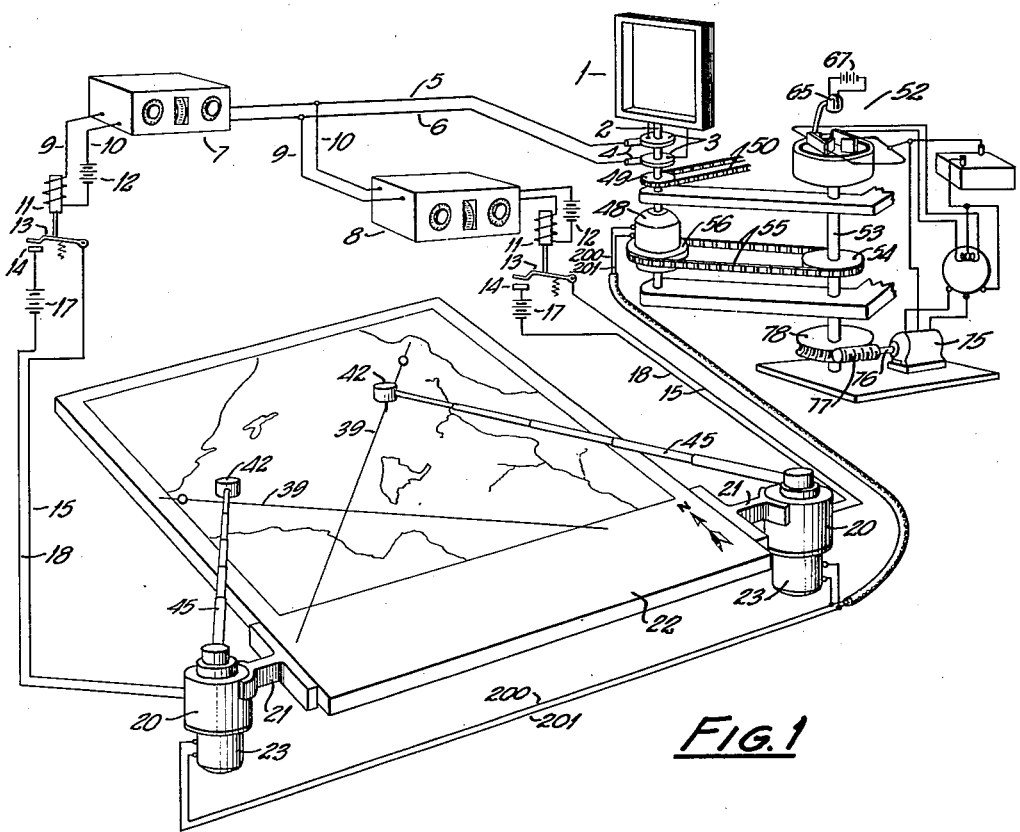
Fig. 1 is a perspective view of an arrangement of the various elements embodied in one form of my invention.

In considering the following description of my invention, it should be borne in mind that the device is designed for use with a chart which may be moved in any direction and relative to the vessel upon which the device is mounted and that the linear indicators thereof are designed for movement relative to a chart so that they may be moved to pivot over points thereon representing the geographical position of chosen broadcasting stations.

A loop antenna 1 is mounted upon a shaft 2 upon which is secured two slip rings 3, the ends of said loop being connected respectively to said rings. Brushes 4 are disposed in sliding engagement with the rings 3 and are connected through conductors 5 and 6 to the input of radio receivers 7 and 8. Inasmuch as the connections between the radio receivers and the linear indicators and the construction of the indicators and their associated mechanism are substantially the same, a description of one is deemed sufficient. The output of receiver 7, for example, is connected to the conductors 9 and 10 which serve to connect a relay 11 in series with a battery 12 across the output terminals of the receiver. The armature 13 of the relay is normally held in open position relative to the contact 14, the magnetic force exerted on the core of the relay being proportional to the output of the receiver 7.

It will be understood that a loop antenna is of the directional type and as the same is rotated through a magnetic field to which the receiver is tuned the power generated by said field will vary depending upon the angular position of the loop with respect to the direction of the broadcasting station. Furthermore, when the loop is turned to occupy a position at right angles to a line coinciding with the direction of the broadcasting station from the loop, no current or power will be generated therein. Hence, it will be understood that the relay 11 is so designed that under normal conditions sufficient power will be supplied thereto to maintain armature 13 in the position illustrated. However, when the loop is positioned at right angles to the chosen station, insufficient power will be supplied to the coil of relay 11 and under the action of the spring which is attached to the armature 13 thereof, contact will be made between armature 13 and contact 14. Armature 13 is connected through a conductor 15 to terminal 16 of the indicator positioning means (see Fig. 2) and contact 14 is connected through battery 17 and conductor 18 to terminal 19 of the indicator positioning mechanism.

Figure 2:
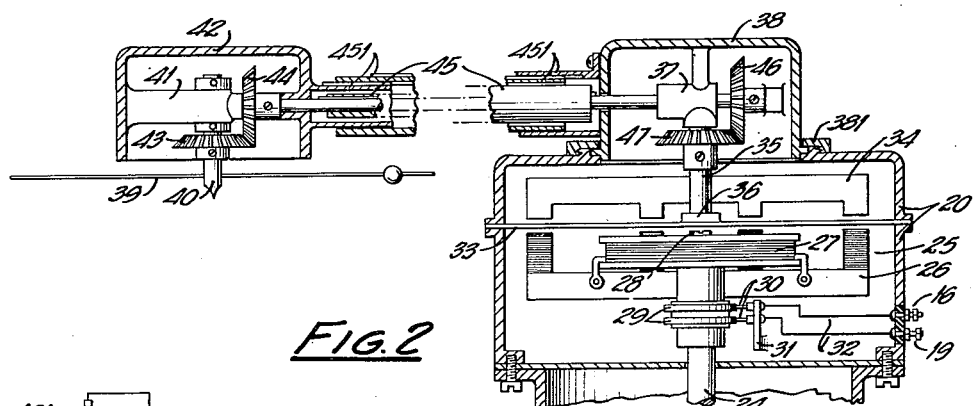
Fig. 2 is a fragmentary, sectional view of the indicator mechanism and associated means for positioning the same.

The indicator-positioning mechanism for the embodiment of my invention illustrated in Fig. 1, generally speaking, is disposed in a casing 20 which in turn is suitably supported by means of a bracket 21 to the chart support 22. A motor 23 preferably of the synchronous type, is suitably secured to the casing 20 and the armature shaft 24 thereof, as illustrated in Fig. 2, serves to support the indicator-positioning mechanism and associated elements. The motor, or motors for the respective indicator-positioning mechanisms where a plurality of indicators are used, is fixed against angular movement relative to the chart for reasons hereinafter pointed out.

The means which I have employed for positioning the indicators is substantially the same as that disclosed in my Patent No. 2,043,336, above referred to. An electromagnet 25 comprising a preferably laminated core 26 and a coil 27 is secured as by means of a set screw 28 on the end of the armature shaft 24 of motor 23. Slip rings 29, suitably insulated from each other and from the hub of the magnet 25 are adapted to be engaged by brushes 30 which in turn are suitably supported on an arm 31 extending from the casting 20. The brushes 30 are respectively connected through conductors 32 to the terminals 16 and 19 on the casing 20. The casing 20 is preferably formed in two parts so that in assembling the magnet 25 may be secured to the motor shaft and, thereafter, a shield 33 may be interposed and secured between the upper portion of the casing and the lower portion thereof. A floating element 34, preferably of silicon steel, or material of similar magnetic qualities is mounted on a shaft 35 which may be supported in a bearing 36 of the shield 33 and in a bearing 37 of a cap 38 which is pivotally supported on the casing 20. The pivotal mounting may be attained by providing cap 38 with an annular flange adapted to rest upon an annular shoulder formed about the opening in casing 20, a ring 38I which is screwed to casing 20 serving to secure the two casings together in relatively pivotal relationship. It will be noted that the pole pieces of the member 34 are designed to conform with the pole pieces of the core 26 of electromagnet 25.

Bearing in mind as above described that when the loop occupies a known position relative to a chosen broadcasting station insufficient power will be delivered by the receiver 7 to support the armature of relay 11 and that a circuit will be closed thereby through the conductors 15 and 18, placing the coil 27 of magnet 25 in circuit with the battery 17 and, as will hereinafter appear, that the magnet 25 is rotated in synchronism with the loop 1, the operation of the magnet 25 on the member 34 angularly to position the same relative either to the electromagnetic field or to a chart, neglecting orientation, is as follows. Assuming that the axis of the core of magnet 25 is disposed at right angles to the axis of the loop antenna 1 and that the magnet and loop are rotated in synchronism, for each position of the loop at right angles to the direction to the broadcasting station, the contacts of relay 11 will be closed and magnet 25 energized. The magnet will, therefore, move the member 34 to occupy a position in parallelism therewith and at right angles to the loop.

Inasmuch as it is contemplated to provide an indicator which may be positioned to pivot over desired points on a chart, I have provided the following means for connecting the same with the member 34 whereby the indicator is movable relative thereto but positionable thereby. The indicator 39 and the shaft 40 therefor are suitably supported in a bracket 41 of a casing 42. Upon shaft 40 and secured thereto is a bevel gear 43 which is adapted to mesh with and be driven by bevel gear 44. Gear 44 is secured on one end of a telescopic shaft 45 which is journaled at one end in casing 42 and bracket 41 and at the other end in bracket 37 of the casing 38. Shaft 45 is driven by the member 34 through the medium of bevel gears 46 and 47 which, respectively, are secured to the shafts 45 and 35. Shaft 45 is preferably disposed within a telescopic arm 45I, as shown in Fig. 2, opposite ends of which are secured to casings 38 and 42. The cooperable, relatively slidable elements forming the telescopic arm 45I are, in the embodiment illustrated, splined and keyed together as shown to prevent turning of casing 42 relative to the casing or cap 38.

It will be evident that, assuming the indicator 39 is disposed in parallelism with the member 34, the means which I have employed in connecting these two elements permits substantially universal movement of the casing 42 relative to the chart and casing 20 while the indicator and member 34 are maintained in parallel relationship.

In accordance with my invention, the magnet 25 and loop 1 are rotated in synchronism and for this purpose I have provided the motors 23 which serve to rotate the magnets 25 and a dynamo, associated with the loop. It is to be understood that the term "dynamo" is intended as descriptive of either a generator or a motor and, within the spirit of my invention, either device may be used. In the form of my invention illustrated in Fig. 1, the armature of a generator 48 is coupled to the shaft 2 of the loop 1, this generator preferably being of the synchronous or Selsyn type. Also mounted on the shaft 2 is a sprocket 49 over which is passed a chain 50 which, it is to be understood, is driven from a suitable prime mover, not illustrated. Hence, when loop 1 is rotated by means of the chain and sprocket 49, generator 48 serves to supply current to the motors 23 and, due to the designs thereof, the armatures of the motors and generator will rotate in synchronism thereby effecting a synchronous rotation of magnets 25 and loop 1. Motors 23 are connected in parallel to generator 48 through conductors 200 and 201.

Figure 3:
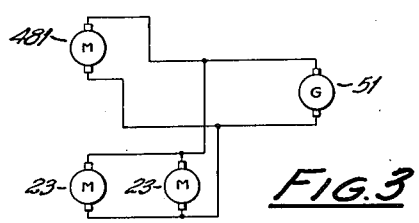
Fig. 3 is a wiring diagram illustrating a modified arrangement for effecting a synchronous rotation of the loop and indicator-positioning mechanism.

As an alternative form, as disclosed in Fig. 3, a motor 481 may be substituted for the generator 48 thereby dispensing with the sprocket 49. In this event, assuming a common source of supply such, for example, as generator 51, motors 481 and 23, being of the synchronous type, will effect a rotation of the loop 1 and magnets 25 in synchronism.

In the foregoing, I have neglected the element of compensation for turning movements of the movable body and have described the means which I employ for positioning an indicator on a chart to occupy a position relative thereto dependent upon a chosen radio magnetic field. However, since it is contemplated that the chart be fixed or movable relative to the vessel upon which it is carried, in which case, of course, it could not be automatically maintained oriented, means must be provided to compensate for the effect which a turning movement of the vessel would cause on the indication afforded on the chart. It is well known that if a compass were provided to maintain a chart permanently oriented no compensating means need be provided and, in this instance, an indicator positioned to pivot over a point thereon representing the geographical position of a broadcasting station to which the receiver is tuned would render a true indication of the direction of such station through space. On the other hand, where the chart is fixed relative to the vessel or movable relative thereto, compensating means must be employed in order to provide accurate indications on the chart. Compensation is effected, in the embodiment of my invention illustrated in Fig. 1, by means of a compass indicated generally at 52 which is mounted upon a shaft 53. A sprocket 54 is secured to shaft 53 and a chain 55 passes thereover and over a sprocket 56 which is secured on the casing or stator of generator 48. Generally speaking, the compass device 52 maintains its casing permanently oriented by means hereinafter described and through the medium of sprockets 54 and 56 and chain 55 also maintains the stator of generator 48 permanently oriented. The theory of compensation using motors for the indicators and a motor or generator with the loop is as follows. If the generator 48 were moved with the vessel, with respect to its orientation, the same degree of movement of its rotor relative to the field or stator thereof would not correspond to the degree of rotation of the loop 1 relative to the magnetic field and, therefore, the rotors of motors 23 would not be maintained in true synchronism with the loop due to the movement of the field of generator 48 relative to the loop and, of course, its armature. On the other hand, for example, by maintaining the stator of the generator 48 permanently oriented, the loop 1 may be rotated through any given angular distance relative to geographical north or a radio station and the armature of the generator 48 will rotate through an equivalent angular distance relative to the generator field or stator. The motor 23, being synchronized with the generator, will effect a rotation of its armature to the same degree as the generator and loop; hence, magnet 25 will be rotated through a corresponding angular distance relative to north on the chart irrespective of movements of the vessel upon which the device is carried. It will be understood, in order to effect compensation in the foregoing manner, that the motors 23 must be disposed in fixed relationship to the chart, or at least fixed against angular movement relative thereto, and, for this purpose, are illustrated as secured to the sides of the chart support 22. Therefore, an imaginary plane passing through the armature of one of the motors 23 will rotate, for example, 360° relative to the north indication on the chart when an imaginary plane through the rotor or armature of generator 48, the stator of which is maintained oriented, rotates through 360° relative to geographical north and, of course, loop 1 rotates through the same angular distance.

In the present embodiment of my invention, the means including the compass device 52 for compensating for turning movements of the vessel is as follows. The compass device 52 which is mounted on the shaft 53 and secured thereto comprises a casing 57, see Fig. 4. Magnetic needle 58 is mounted on a spindle 59 journaled in bearings 60 and 61 in the bottom and top plates, respectively, of a casing 62 which is mounted for universal movement within the casing 57. For this purpose a gimbal ring 63 is provided, casing 62 being rotatably supported at diametrically opposed points in ring 63 and ring 63 being rotatably supported in casing 57 and at points in quadrature with the supporting points of casing 62. Hence, casing 62 and magnetic needle 58 are thus maintained in a horizontal position irrespective of the movements of the vessel upon which it is mounted. A source of light, which is shown in the form of an incandescent lamp 64 is mounted in a casing 65 which in turn is suitably supported in a bracket 66 extending from the casing 62. A suitable source of electrical energy such, for example, as a battery 67 is provided in circuit with lamp 64. A transverse opaque partition 68 is provided in the casing 65 and is provided with a narrow slit 681, see Fig. 6, which serves to create a comparatively narrow beam of light which is designed to pass thence through a projecting lens 69.

A mirror 70 is mounted on the upper end of the spindle 59 and preferably at an angle of 45° thereto. Photoelectric cells, preferably selenium cells, 71 and 72 are mounted on the casing 62 and preferably in parallel relation, as illustrated in Figs. 5 and 7. At the respective ends of the cells are mounted two pairs of mirrors 73 and 74 which are arranged at an angle to the photoelectric cells. The ends of the two pairs of mirrors are slightly spaced and the lens 69 is so located relatively thereto and to the slit 681 as normally to project the image of the slit through the space between the mirrors, for example 74.

The means for maintaining casing 57 of the compass device 52 and, of course, the stator of generator 48, in a predetermined direction also comprises a motor indicated at 75 which, it will be understood, is mounted on a stationary portion of the vessel. Shaft 76 of the motor is provided with a worm 77 disposed to engage a worm wheel 78 which is mounted and secured to shaft 53.

As illustrated in Fig. 7, the selenium cells 71 and 72 are connected through a conductor 79 to one pole of a battery 80. The other pole of the battery is connected to a point from which the circuit branches, one portion of the circuit including a coil 81 and conductor 82 which is connected to selenium cell 71 while the other branch includes coil 83 and conductor 84 which is connected to the other selenium cell 72. Battery 80 is also connected to the armature 85 of the motor 75. This motor comprises a field indicated generally at 86 which includes two windings 87 and 88. One terminal of winding 87 is connected to a movable contact 89 which cooperates with a fixed contact 90 while one terminal of the field coil 88 is connected to a movable contact 91, adapted to cooperate with a fixed contact 92. Both of the fixed contacts 90 and 92 are connected by a conductor 93 to the battery 80.

I have illustrated the coils 81 and 83 as wound about a core in such a manner as to produce a north pole at the associated end of the core 94 when either of said coils is energized. A permanent magnet 95 is preferably associated with the core 94 so that the respective ends of the core are depressed when coil 81 or 83 is energized. Therefore, depending upon which of the coils 81 or 83 is energized, contact 89 or 91 is brought into engagement with contact 90 or 92.

The operation of my orienting device is as follows. Normally, as above indicated, the line or beam of light from the light source 64 is adapted to pass between, for example, the mirrors 74. Assuming that the body or vessel turns, the casing 57 will be turned relative to the magnetic needle 58 and, of course, the beam of light will then impinge upon one or the other of the mirrors 74 and be reflected thereby upon one of the selenium cells 71 and 72. The direction of movement of the beam, of course, depends upon the direction of movement of the vessel. Assuming that the vessel so turns that light is directed against the selenium cell 71, the resistance of this cell is greatly reduced and coil 81, which is included in circuit with cell 71 and which is normally de-energized, becomes energized and the associated end of the core 94 is magnetized and depressed due to the magnetic attraction exerted between it and the magnet 95. Contact 89, therefore, is brought into engagement with contact 90 and the circuit through coil 87 of the field circuit of motor 75 is created. The motor 75 is so designed that energization of field 87, which is connected in series with the armature thereof, effects a rotation of shaft 53 in a direction to return the mirrors 74 to a position wherein the light beam from the mirror passes therebetween. Conversely, the turning of the vessel in the opposite direction to that above described will, through the medium of selenium cell 72, effect an energization of motor 75 to rotate shaft 53 in the opposite direction. Obviously, as above described, orientation of the compass device 52 also effects an orientation of the stator of the generator 48.

In the foregoing, I have referred to my invention generally in connection with a single indicator and a chart associated therewith. Obviously, with the employment of the herein described mechanisms and the use of a single indicator disposed in cooperable relationship with a chart, a directional indication would be afforded. On the other hand, by employing two indicators as disclosed in Fig. 1, the geographical position of the vessel will be indicated on the chart by the intersection of the linear indicators.

In the operation of my device, it is merely necessary to select two spaced radio stations, position the respective indicators over points on the map or chart representing the geographical positions of the stations so chosen and, assuming the electrical mechanisms are in operation, tune the receiving set associated with each of the indicators to the respective stations represented by the points so chosen on the chart. The subsequent operation of the device is carried out automatically and, it should be evident, that due to the compensating means provided and the electrical interconnection of the synchronized elements the chart with the indicating mechanisms attached thereto is capable of being substantially universally moved without affecting in any way the precision of the indications afforded on the chart.

In the foregoing, it will be remembered that the necessity of fixing the motors 23 against angular movement relative to the chart was pointed out. In the modification of my invention illustrated in Fig. 8, I have provided means whereby the motors employed in actuating the indicator-positioning means may be associated directly with said indicators and mounted for movement over the chart but fixed against angular movement relative thereto.

In Fig. 9, a motor 96 of the synchronous type is mounted in a casing 97. On the armature shaft of the motor is mounted a magnet 98 of the general type indicated at 25 in Fig. 2. A shield 99 separates the magnet 98 from the rotatable member 100 which is secured to the shaft 101 of the indicator 102. Suitable slip rings 103 are provided on the armature shaft which are engaged by brushes 104 to which are connected, for example, conductors 15 and 18 of the relay circuit associated with one of the receiving sets. It will be evident that the device illustrated in Fig. 9 operates substantially in the same manner as that illustrated in Fig. 2 with the exception that the gearing connection between the member 34 and the indicator has been eliminated.

The casing 97 is supported on a pantograph or parallel-motion device indicated generally at 105 in Fig. 8. It is believed evident that by employing a pantograph for supporting the casing 97 for the indicator 102 that said indicator may be moved over the chart to pivot over chosen points thereon without moving the motor 96 angularly with respect to the chart. Inasmuch as the remaining elements and their manner of cooperation are substantially the same as those hereinbefore described, it is believed unnecessary further to describe the same in connection with Fig. 8.

It will be understood that my invention should not be construed as limited to cooperable indicators for indicating the positions of movable bodies but that a single indicator may be used in cooperation with a chart or other suitable device whereby directional indications may be afforded. Furthermore, various equivalents may be substituted for individual elements of my device as, for example, lines of light for the indicators illustrated. Hence, while I have described my invention in its preferred embodiments, it is to be understood that the words which I have used are words of description rather than of limitation and that changes within the purview of the appended claims may be made without departing from the true scope and spirit of my invention in its broader aspects.

What I claim is:

1. In a device of the character described for use on a movable body, rotatable means for receiving electromagnetic waves transmitted from distant stations, a chart, pivotally mounted indicator means for indicating on said chart the direction from said body to a station, rotatably mounted electrical means controlled by said receiving means for rotatably positioning said indicator means, a pair of electrical means electrically connected together and operatively connected one with said indicator-positioning means and the other with said receiving means for maintaining them in predetermined angular relationship, said pair of electrical means including respectively a stator and rotor, means for movably supporting said indicator-positioning means and the electrical means operatively connected therewith over said chart but preventing angular movement of the stator of said electrical means relative to said chart whereby to permit said indicator means to be positioned to pivot over desired points on said chart while preserving said predetermined angular relationship between said indicator-positioning means and said receiving means, and means operatively connected with one of said pair of electrical means and operable in response to a turning movement of said body for effecting a change in the relationship of said indicator-positioning means and receiving means whereby to compensate for the effect of a turning movement of said body on said indicating means.

2. In a device of the character described for use on a movable body, rotatable means for receiving electromagnetic waves transmitted from distant stations, a chart, pivotally mounted indicator means for indicating on said chart the direction from said body to a station, rotatably mounted electrical means controlled by said receiving means for rotatably positioning said indicator means, a pair of electrical means electrically connected together and operatively connected one with said indicator-positioning means and the other with said receiving means for maintaining them in predetermined angular relationship, said pair of electrical means including respectively a stator and rotor, pantographic means for movably supporting said indicator-positioning means and the electrical means operatively connected therewith over said chart whereby to permit said indicator means to be positioned to pivot over desired points on said chart while preserving said predetermined angular relationship between said indicator-positioning means and said receiving means, and means operatively connected with one of said pair of electrical means and operable in response to a turning movement of said body for effecting a change in the relationship of said indicator-positioning means and receiving means whereby to compensate for the effect of a turning movement of said body on said indicating means.

HJALMAR E. SJÖSTRAND.